United States Patent [19]

Mathews et al.

[11] Patent Number: 5,505,998
[45] Date of Patent: Apr. 9, 1996

[54] ACIDIC GLASS FIBER BINDING COMPOSITION, METHOD OF USE AND CURABLE GLASS FIBER COMPOSITIONS

[75] Inventors: Dale J. Mathews, Toledo, Ohio; Philip F. Miele, highlands Ranch, Colo.; Edmund G. Dornfeld, Defiance, Ohio

[73] Assignee: Schuller International, Inc., Denver, Colo.

[21] Appl. No.: 232,554

[22] Filed: Apr. 25, 1994

Related U.S. Application Data

[63] Continuation of Ser. No. 886,666, May 19, 1992, Pat. No. 5,358,748.

[51] Int. Cl.$^6$ ....................................... B05D 3/02
[52] U.S. Cl. .................. 427/389.8; 428/290; 428/375; 524/841; 528/145; 528/162; 528/165
[58] Field of Search ................. 427/389.8; 428/290, 428/375; 524/841; 528/145, 162, 165

[56] References Cited

U.S. PATENT DOCUMENTS

| | | | |
|---|---|---|---|
| Re. 30,375 | 8/1980 | Deuzeman et al. | 525/497 X |
| 2,931,738 | 4/1960 | Stalego | 117/126 |
| 3,072,595 | 1/1963 | Bart et al. | 260/45.1 |
| 3,223,668 | 12/1965 | Stalego | 260/29.3 |
| 3,253,948 | 5/1966 | Tiede | 117/126 |
| 3,331,885 | 7/1967 | Rider et al. | 260/826 |
| 3,487,048 | 12/1969 | Deuzeman | 260/67.7 |
| 3,616,179 | 10/1971 | McCombs et al. | 156/335 X |
| 3,617,428 | 11/1971 | Carlson | 161/133 |
| 3,702,798 | 11/1972 | Shannon | 161/170 |
| 3,707,296 | 12/1972 | Palazzolo et al. | 280/11.13 L |
| 3,734,918 | 5/1973 | Meger et al. | 156/331 X |
| 3,817,920 | 6/1974 | Lengager | 260/47 R |
| 3,819,441 | 6/1974 | Fargo et al. | 156/167 |
| 3,839,236 | 10/1974 | Foley et al. | 260/25 |
| 3,907,724 | 9/1975 | Higginbottom | 260/7 |
| 3,915,905 | 10/1975 | Hanton | 260/2.5 F |
| 3,919,134 | 11/1975 | Higginbottom | 428/290 X |
| 3,956,204 | 5/1976 | Higginbottom | 428/290 X |
| 3,956,205 | 5/1976 | Higginbottom | 428/290 X |
| 4,028,367 | 6/1977 | Higginbottom | 524/841 |
| 4,060,504 | 11/1977 | Higginbottom | 428/264 X |
| 4,176,105 | 11/1979 | Miedaner | 427/221 X |
| 4,285,848 | 8/1981 | Hickson | 525/497 X |
| 4,324,833 | 4/1982 | Yau | 428/290 |
| 4,576,972 | 3/1986 | Lunt et al. | 521/131 X |
| 4,611,020 | 9/1986 | Bornstein et al. | 524/233 |
| 4,757,108 | 7/1988 | Walisser | 524/596 |
| 4,960,826 | 10/1990 | Walisser | 524/494 |

*Primary Examiner*—Michael Lusignan
*Attorney, Agent, or Firm*—Cornelius P. Quinn

[57] ABSTRACT

Described is an acidic glass fiber binding composition comprising an aqueous soluble phenol formaldehyde resin having low free formaldehyde, an effective amount of a formaldehyde scavenger, and an effective amount of a strong aqueous soluble acid, wherein the composition has an acidic pH and the solids content ranges from about 1 to about 30% by weight of the total composition. Also described is a method of binding glass fibers such as newly formed warm glass fibers at junctions of the fibers by applying the composition as described above to the fibers and then drying the composition. Also described are B-staged and C-staged glass fiber compositions having a alkylamine content less than 5 ppm.

11 Claims, No Drawings

ACIDIC GLASS FIBER BINDING COMPOSITION, METHOD OF USE AND CURABLE GLASS FIBER COMPOSITIONS

This is a continuation of application(s) Ser. No. 07/886,666 filed on May 19, 1992, now U.S. Pat. No. 5,358,748.

TECHNICAL FIELD

The present invention is concerned with low odor, cured glass fiber compositions derived from phenol formaldehyde resins. The invention is also concerned with acidic glass fiber binding composition utilizing phenol formaldehyde resins and the method of use of those resins.

BACKGROUND ART

Water soluble phenol formaldehyde resins such as resoles have been known for a number of years. See, for example, U.S. Pat. Nos. 4,757,108 and 4,960,826, hereby incorporated by reference.

Emulsifiable resoles having dispersed inert salts are described in U.S. Pat. No. 4,060,504. The emulsifiers that are utilized are proteinaceous compounds which are prepared in the presence of alkali metal hydroxide, ammonium hydroxide or organic amines such as triethyl amine. Suitable proteinaceous compounds include casein, soya protein, and the like.

Other patents of interest in the phenol formaldehyde/glass fiber area are U.S. Pat. Nos. 2,931,738; 3,072,595; 3,223,668; 3,253,948; 3,331,885; 3,487,048; 3,616,179; 3,617,428; 3,702,798; 3,707,296; 3,734,918; 3,819,441; 3,817,920; 3,839,236; 3,907,724; 3,915,905; 3,919,134; 3,956,204; 3,956,205; 4,176,105; 4,285,848; 4,324,833; 4,611,020; 4,757,108; and Re. 30,375.

The difficulty that has occurred with many phenol formaldehyde resins that have been utilized in the past is that, in the final cured product, there is a highly offensive fishy or ammoniacal odor. The odor results from the degradation of urea that is used as a formaldehyde scavenger in the curing process. The final product contains undesirable quantities of odoriferous materials which are alkylamines. The alkylamines are mono-di- or trialkylated amines wherein the number of carbon atoms is from 1 to 3 per alkyl group.

It is an object of the present invention to obtain fully cured glass fiber compositions with phenol formaldehyde resins binding the junctions of the glass fiber with low odor associated with such cured glass fiber compositions.

SUMMARY OF THE INVENTION

Described is an aqueous glass fiber binding composition comprising:

a. an aqueous soluble phenol formaldehyde resin having low free formaldehyde;

b. an effective amount of a formaldehyde scavenger; and c. an effective amount of a strong aqueous soluble acid, wherein the composition has an acidic pH and the solids content ranges from about 1 to about 30% by weight of the total composition.

Also described is a method of binding newly formed warm glass fibers at junctions of the fibers comprising the steps of:

a. providing newly formed glass fibers;

b. applying the aforementioned acidic glass fiber binding composition to the fibers; and c. drying the composition on the fibers to a desirable level.

Also described is a B-stage curable glass fiber composition containing glass fibers having the aforementioned binder composition applied thereto wherein the B-stage curable glass fiber composition has an alkylamine content of less than 5 parts per million.

Also described is a C-stage glass fiber composition comprising glass fibers shaped to a desirable configuration having a cured binder at the junction of the fibers and wherein the final composition has an alkylamine content of less than 5 parts per million.

DESCRIPTION OF PREFERRED EMBODIMENTS

The present invention is concerned with the application of a phenol formaldehyde binder composition to glass fibers. Any technique for the manufacture of glass fibers is satisfactory. While not a complete listing of all glass fiber manufacturing techniques, some of the fiberization manufacturing techniques can be described as the hot marble process or the air blown process, and the like. In such cases, the glass melt is formed and the glass is passed through spinnerettes whereby air is blown onto the melted glass as it comes through the spinnerettes thereby forming the glass fiber. Mineral wool can be formed from a melted fraction channeled down a V-shaped trough. Fiberization occurs by steam application through jets at the bottom of a trough; also a steam blown process may be utilized for rock wool. It is a technique of blasting steam jets onto downward flowing, free streams of melted vitreous material. A flame attenuation process utilizes a technique whereby the fibers are formed from primary filaments. High speed spinning processes likewise can be utilized to form glass fibers. A rotary process likewise may be used. See the book "Glass Fibers" by J. Gilbert Mohr and William P. Rowe, Van Nostrand, Reinhold Company, published in 1978. The book describes numerous fiberizing techniques at pp. 4–16, hereby incorporated by reference.

In each of the fiberizing techniques, newly formed glass fibers are warm. The glass fibers then have an aqueous binder applied thereto to bind the junctions of the glass fibers. It is to be appreciated that the glass fibers to which this invention is directed can also include glass fibers other than recently formed glass fibers. In other words, the glass fibers may be already formed or are in a bat or mat condition and then the binder is applied. The binder that is utilized is a phenol formaldehyde resin generally characterized as one that has a low free formaldehyde content (less than 5%, even more preferably less than 2% with a free phenol content of less than 5%, even more preferably less than 3%). A preferred resin is one supplied by Borden Chemical of Columbus, Ohio identified as IB 746 B. The material has a nominal 2% by weight formaldehyde and 4% by weight of free phenol present in water. The preferred volatiles are 49.5% by weight with a flash point greater than 200° F. The material has a alkaline pH ranging from about 9 to 9.6, measured at 25° F. and a hot plate cure time of 2.75 minutes at 275° F. The Borden material is a resole phenol formaldehyde resin.

While it is believed that the aforementioned phenol formaldehyde resin is the most preferred, phenol formaldehyde resins having low free formaldehyde may be utilized as is Commercially available. See U.S. Pat. Nos. 4,257,108 and 4,960,826, supra, for a broad listing of various phenol formaldehyde resins.

The binder composition that is to be applied to the newly formed glass fibers should have a formaldehyde scavenger.

The formaldehyde scavenger that is to be utilized obviously should not be something that causes the alkylamine odor. Therefore, any generally available formaldehyde scavenger may be utilized such as nitrogen heterocyclic materials having a replaceable hydrogen attached to an amine of the compound such as amino triazines such as melamine, guanamine, benzol quanamine, and the like. Other formaldehyde scavengers may be utilized such as guanidine, dicyandiamide, and the like. The amount of formaldehyde scavenger that is utilized is between 0.5 to 3.0 mole per mole of free formaldehyde present in the phenol formaldehyde resin.

What has also been found highly desirable in obtaining the low alkylamine which causes the odor in the cured glass fiber composition is to use a strong aqueous soluble acid where the binder composition that is applied to the warm glass fibers has an acidic pH. Preferably, the binder composition has a pH ranging from about 4 to 6.5, preferably 4.5 to 6. The use of acidic binder phenol formaldehyde compositions is quite different in the present case because most phenol formaldehyde resins that are commercially available are on the basic side, generally having a pH of 8 to 9.5 and above. It has been highly desirable to utilize the acidic pH for the binder composition to control the odor problem of the cured glass fiber composition, e.g., the evolution of formaldehyde during the binder curing.

It is most desirable that the acid that is utilized have a pK value for a strong acid, preferably a pK value of 4 or less. For example, preferred materials are sulfamic acid which gives pH values lower than solutions of formic, phosphoric and oxalic acids. By pK, is meant the extent of the association or the strength of acids. Other suitable acids are oxalic acid, which has a pK for the first hydrogen of 1.23, even though the second hydrogen released has a pK of 4.19. Strong inorganic acids such as sulfuric acid has a pK of −3 and is also desirable. The acid that is utilized is one that would not interfere with the appropriate curing of the phenol formaldehyde resin. The amount of acid that is utilized is only that which is sufficient to give a final pH of the binding composition as reflected above. For a discussion of pK values, see the HANDBOOK OF CHEMISTRY & PHYSICS, 1984 edition, pp. D150 and D165–167, published by CRC Press, Inc. of Boca Raton, Fla.

After the application of the binder composition to the glass fibers, there is a partial curing to what is called the B-stage product. By this is meant that the glass fiber composition has the binder at least on the junctions of the glass fiber to permit subsequent shaping to a desired configuration of a final cured product. The B-stage product facilitates handling and shipping of the glass fiber composition such as a mat or blanket, and the like.

The final cured compositions take on an innumerable number of forms as desired by the end user. Suitable final cured configurations for glass fiber compositions of the present invention include vehicular interior trim including headliners, dash insulators, HVAC (heating ventilation air conditioning) insulators, hood insulators, duct wrap, duct board, duct liner, air filtration, and other desirable final cured compositions. Generally, the desired shape occurs by a molding technique.

The curing of the glass fiber composition with a binder applied thereto as described herein is generally very quick depending upon the temperature and time desired. Generally, the temperature ranges from about 400° to about 650° F. with a period of time of less than 5 minutes, preferably from 30 seconds to 2 minutes, and even more preferably 45 seconds to 90 seconds such as for headliners.

In order to detect the alkylamine, suitable analytical testing is permissible. A technique is to subject the final cured product to high temperature of about 125° F. and 95% relative humidity for a desired period of time such as 3 hours and thereby detect the presence of the alkylamine. The composite density of the final product can range up to about 20 pounds per cubic foot (PCF), preferably 1 to about 15 PCF. The most undesirable alkylamine that causes odor in the composition is trimethylamine.

It has also been found desirable to add to the binding composition as desired, silicon containing materials which decrease the moisture absorption of the resin. A suitable material is a silane. It assists in the coupling of the polymer to the glass fiber. A preferred material is Union Carbide 1101 which is an amino functional silane.

It is to be appreciated that the amount of binder that is applied to the glass fiber is not of a nature to completely coat the glass fiber, but only sufficient to give a binding at the junction of the glass fibers. The final cured product therefore can be characterized as having a binder on the glass composition as a maximum of 30% loss on ignition (LOI), preferably 15% LOI.

It has been found highly desirable in order to properly apply the binder composition to the newly formed glass fibers that the components of the composition be substantially soluble in water. A preferred mixing sequence is as follows:

1. Add sufficient hot water (40°–80° C.); in other words, hot water is added to an empty tank in the amount of approximately 800 gallons of water;
2. Add the desired melamine or other desired formaldehyde scavenger with vigorous agitation;
3. Add the remaining hot water, preferably, approximately 700 gallons;
4. Add the desired amount of phenol formal-dehyde resin;
5. Add the strong acid such as sulfamic acid;
6. Check the pH and adjust to a pH of 5.3 plus or minus 0.3;
7. Add the desired amount of the coupling agent such as silane.

It is most desirable that the final binder mix temperature be about 80°–115° F. with no undissolved solids and a total solids content of approximately 3.5%.

Listed below are exemplifications of preferred embodiments of the invention wherein all parts are parts by weight and all temperatures are in degrees Centigrade, unless otherwise indicated.

EXAMPLE 1

Three aqueous phenol formaldehyde binder compositions were prepared having a pH of 4.5, 5.5 and 6.5. The binder mixing formula utilized was:

| Composition | Amount |
| --- | --- |
| Hot Water (90–115° F.) | 1500 gallons |
| Phenol Formaldehyde Resin (Borden IB 746 B) | 71 gallons |
| Melamine | 64 pounds |
| Sulfamic Acid | 53 pounds |
| Silane | 411 milliliters |

The materials were mixed as recited in the aforementioned mixing sequence. The final pH was adjusted as indicated above to form 3 binder compositions.

Uncured glass fiber compositions were sprayed with the 3 different compositions as recited above with the difference being the pH levels. The products were molded at 2 different temperatures —475° F. and 525° F. with 4 different molding cycle times (45, 60, 75 and 90 seconds).

Listed below are the test results in determining the level of trimethylamine present using the different pH compositions and the different length of time and temperature for curing an automotive topliner. For comparison purposes, a standard commercially available phenol formaldehyde resin was used as a control. The results are reflected below:

Trimethylamine Test Results
Binder/Time/Temp/pH Matrices pH 6.5

|  | 45 sec. | 60 sec. | 75 sec. | 90 sec. |
|---|---|---|---|---|
| 475° F. | ND* | ND | 0.3 | ND |
|  | 0.3 | 0.7 | ND | ND |
| 525° F. | ND | ND | ND | ND |
|  | ND | ND | ND | ND | pH 5.5

|  | 45 sec. | 60 sec. | 75 sec. | 90 sec. |
|---|---|---|---|---|
| 475° F. | ND | ND | ND | ND |
|  | ND | ND | ND | ND |
| 525° F. | ND | ND | ND | ND |
|  | ND | ND | ND | ND | pH 4.5

|  | 45 sec. | 60 sec. | 75 sec. | 90 sec. |
|---|---|---|---|---|
| 475° F. | ND | ND | ND | ND |
|  | ND | ND | ND | ND |
| 525° F. | ND | ND | ND | ND |
|  | ND | 0.1 | 0.1 | ND |

5.5 pH Optimization Molding

|  | 45 sec. | 50 sec. | 55 sec. | 60 sec. | 65 sec |
|---|---|---|---|---|---|
| 535° F. (Top)** | ND | ND | ND | ND | ND |
| 475° F. (Btm)** | ND | ND | ND | ND | ND |

Standard Binder

| 450° F. | 9.5 |
|---|---|
| 2 min. | 9.3 |

*ND means not detected = <0.1 ppm.
**Top and bottom indicate top and bottom of mold cavities.

The testing technique utilized to determine the trimethylamine was as follows.

The equipment that was utilized, as well as the reagents, are as follows:
Wide Mouth Glass Quart Jars with screw cap (Mason Jar);
Crimp seal sample vials (approximately 4.0 ml);
Convection Oven capable of maintaining 38° C.±2° C.;
Gas Chromatograph with Flame Ionization Detector;
Stock TMA solution, 1000 ppm—Weight 0,163g of Trimethylamine Hydrochloride into a 100 ml volumetric flask and dilute to 100 ml with distilled water;
2 normal sodium hydroxide; and
Acetone, chromatography grade.

The test procedure is as follows:

Weight 10.00±0.02 grams boiled distilled water into a glass quart jar containing a 6.5 centimeter tall sample support (open ended 100 milliliter plastic tricornered polypropylene beaker with corners clipped and out to 6.5 centimeter height). Place an 8.9 centimeter diameter disk (cut from non-absorbing plastic open mesh sink matting) on top of the sample support. Evenly distribute 12.00±0.10 grams of well mixed cubed insulation into jar above the sample support. Cubes should be approximately 1"×1". Screw the lid over a piece of clear polyethylene film to seal each jar. Place jars in a convection oven set at 38C±2C over 16 hours. Remove jars from oven and cool to room temperatures.

The sample analysis is as follows:

Add 1.71 ml of water from mason jar to a crimp seal sample vial. Add 0.09 ml of 2 Normal NaOH containing 0.02% v/v Acetone and seal sample vial. Use injection volume of 2 microliters. Make calibration curve from 1, 4, 10, 20, 80 ppm TMA solutions prepared from 1000 ppm solution.

G-C Conditions
1. Machine: HP-5890 with FID
2. Column: Wide bore capillary column 30 meter DB Wax J&W Scientific Folsom, CA
   1 micron film, 0.53 mm diameter
3. Carrier Gas: 11 ml/min Helium
4. Program: Injector temp. 180° C. Detector temp. 240° C. 35° C. for 5 min. 15° C./min. to 180° C. 180° C. for 10 min.

With respect to results, report trimethylamine as micrograms of TMA in water based on sample weight (microgram/gram) of fiber glass.

While the forms of the invention herein disclosed constitute presently preferred embodiments, many others are possible. It is not intended herein to mention all of the possible equivalent forms or ramifications of the invention. It is understood that terms used herein are merely descriptive rather than limiting, and that various changes may be made without departing from the spirit or scope of the invention.

It is to be appreciated that other modifications may be made to the invention that one working in the area could utilize. For example, when one is utilizing hot water in an acidic environment, the piping that is utilized as well as the valves and joints in the delivery system would need to be of a nature that can withstand corrosion. Stainless steel type materials may be utilized. Other comparable modifications may likewise be made without departing from the scope of the invention.

What is claimed is:

1. A method of decreasing the odor of cured glass fiber composition comprising the steps of:

a. providing newly formed glass fibers;

b. applying an acidic glass fiber binding composition comprising an aqueous soluble phenol formaldehyde resin in an effective film forming amount from about 1 to about 5% by weight when applied, an effective scavenging amount of a formaldehyde scavenger, and an effective amount of a strong aqueous soluble acid, wherein the composition has an acidic pH and the solids content ranges from about 1 to about 30% by weight of the total composition; and c. curing the resin wherein the cured composition has an alkylamine content of less than 5 ppm.

2. The method of claim 1 wherein the phenol formaldehyde resin is a resole.

3. The method of claim 1 wherein the formaldehyde scavenger is a nitrogen heterocyclic compound having a replaceable hydrogen attached to an amine of the compound.

4. The method of claim 3 wherein the nitrogen compound is a triazine.

5. The method of claim 4 the triazine is melamine.

6. The method of claim 1 wherein the scavenger is present in an amount of 1 to about 20% by weight of the total composition.

7. The method of claim 1 wherein the scavenger is comprised of a quanidine compound.

8. The method of claim 1 wherein the strong aqueous soluble acid has a pK disassociation value of 4 or less.

9. The method of claim 1 wherein the strong aqueous acid is comprised of sulfamic acid.

10. The method of claim 1 wherein the alkylamine is trimethylamine.

11. A method of decreasing the odor of cured glass fiber compositions, comprising the steps of:

a. providing glass fibers;

b. applying an acidic glass fiber binding composition comprising an aqueous soluble phenol formaldehyde resin in an effective film forming amount which ranges from about 1 to about by weight when applied, an effective scavenging amount of a formaldehyde scavenger, and an effective amount of a strong aqueous soluble acid, wherein the composition has an acidic pH and the solids contents ranges from about 1 to about 30% by weight of the total composition; and c. curing the resin wherein the cured composition has an alkylamine content of less than 5 ppm.

* * * * *

UNITED STATES PATENT AND TRADEMARK OFFICE
CERTIFICATE OF CORRECTION

PATENT NO. : 5,505,998
DATED : April 9, 1996
INVENTOR(S) : dale J. Mathews, e.t al.

It is certified that error appears in the above-indentified patent and that said Letters Patent is hereby corrected as shown below:

Column 7, claim 5, line 3, after "4" insert --wherein--.

Column 8, claim 11, line 4, after "abut" insert --5%--.

Signed and Sealed this

Twenty-seventh Day of August, 1996

Attest:

BRUCE LEHMAN

*Attesting Officer*  *Commissioner of Patents and Trademarks*